US011904399B2

United States Patent
Jan et al.

(10) Patent No.: US 11,904,399 B2
(45) Date of Patent: Feb. 20, 2024

(54) ONLINE PREDICTION METHOD OF TOOL-ELECTRODE CONSUMPTION AND PREDICTION METHOD OF MACHINING ACCURACY

(71) Applicant: Metal Industries Research & Development Centre, Kaohsiung (TW)

(72) Inventors: Chia-Ming Jan, Kaohsiung (TW); Wen-Chieh Wu, Taichung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 629 days.

(21) Appl. No.: 17/106,191

(22) Filed: Nov. 30, 2020

(65) Prior Publication Data

US 2022/0168834 A1 Jun. 2, 2022

(51) Int. Cl.
*G06F 17/18* (2006.01)
*B23H 7/20* (2006.01)
*B23H 11/00* (2006.01)
*B23H 1/02* (2006.01)

(52) U.S. Cl.
CPC .............. *B23H 7/20* (2013.01); *B23H 1/024* (2013.01); *B23H 11/00* (2013.01); *G06F 17/18* (2013.01); *B23H 2600/00* (2013.01); *G05B 2219/45221* (2013.01)

(58) Field of Classification Search
None
See application file for complete search history.

(56) References Cited

U.S. PATENT DOCUMENTS

| 7,259,347 B2 | 8/2007 | Sasaki et al. |
| 7,596,424 B2 * | 9/2009 | Lin .............. B23H 7/20 700/162 |
| 10,908,572 B2 * | 2/2021 | Sakai ............ G05B 19/042 |
| 2002/0026257 A1 * | 2/2002 | Newmark ....... G05B 19/41805 700/51 |
| 2007/0162906 A1 * | 7/2007 | Chandhoke ....... G06F 9/4881 718/100 |
| 2011/0208952 A1 * | 8/2011 | Kokura ............ G05B 19/05 712/E9.017 |

(Continued)

FOREIGN PATENT DOCUMENTS

| CN | 100577336 | 1/2010 |
| CN | 109500464 | 3/2019 |

(Continued)

OTHER PUBLICATIONS

Office Action of Taiwan Counterpart Application, dated Dec. 29, 2021, pp. 1-6.

*Primary Examiner* — Jason Lin
(74) *Attorney, Agent, or Firm* — JCIPRNET

(57) ABSTRACT

An online prediction method of tool-electrode consumption adapted for an electrical discharge machining (EDM) apparatus includes an experimental design; extracting electrode consumption variables from machining parameters of the electrical discharge machining (EDM) apparatus; and obtaining a correlation between the machining parameters and the electrode consumption variables through a correlation analysis to obtain a prediction model capable of predicting an effective contact area of a tool-electrode and a workpiece. In addition, a prediction method of machining accuracy is provided.

12 Claims, 7 Drawing Sheets

(56) References Cited

U.S. PATENT DOCUMENTS

| | | | |
|---|---|---|---|
| 2013/0213941 A1* | 8/2013 | Asai | B23H 1/02 |
| | | | 219/69.11 |
| 2015/0112459 A1* | 4/2015 | Haraguchi | G05B 19/408 |
| | | | 700/86 |
| 2018/0095438 A1* | 4/2018 | Koga | G05B 19/066 |
| 2018/0207737 A1* | 7/2018 | Hanaoka | G05B 19/402 |
| 2019/0033814 A1* | 1/2019 | Tscherepanow | G06F 9/4881 |
| 2021/0031322 A1* | 2/2021 | Yamaguchi | B23Q 17/0995 |

FOREIGN PATENT DOCUMENTS

| | | | |
|---|---|---|---|
| CN | 110457846 A | * | 11/2019 |
| TW | 201837732 | | 10/2018 |
| TW | 201924828 | | 7/2019 |
| TW | 201924828 A | * | 7/2019 |

\* cited by examiner

| $N_{total}$ | $R_A$ | $R_B$ | L | T | $A_{eff}$ | FITS |
|---|---|---|---|---|---|---|
| 2436 | 0 | 22 | −3.381 | 2200 | 200.96 | 201.8778 |
| 2385 | 0 | 0 | −3.81 | 2200 | 200.96 | 202.5463 |
| 2351 | 0 | 0 | −1.162 | 929 | 176.625 | 188.4497 |
| 2484 | 0 | 33 | −3.434 | 1929 | 176.625 | 188.5814 |
| 2336 | 0 | 0 | −1.114 | 779 | 153.86 | 167.0593 |
| 2609 | 0 | 0 | −3.657 | 1779 | 153.86 | 154.3663 |
| 2288 | 0 | 110 | −3.205 | 1264 | 113.04 | 108.9642 |
| 2349 | 0 | 121 | −1.846 | 748 | 94.985 | 97.39734 |
| 1759 | 29 | 33 | −3.148 | 1029 | 78.5 | 72.99845 |

ONLINE PREDICTION METHOD OF TOOL-ELECTRODE CONSUMPTION AND PREDICTION METHOD OF MACHINING ACCURACY

BACKGROUND

Technical Field

The disclosure relates to a prediction method of machining accuracy, and in particular to an online prediction method of tool-electrode consumption and a prediction method of machining accuracy.

Description of Related Art

When performing electrical discharge machining, often factors like the poor slag discharge, the abnormal short circuit, or the electrode consumption of an apparatus lead to the poor quality of a workpiece. For example, the size of the workpiece fails to meet expectations, or the surface roughness of the workpiece is poor. Furthermore, generally an electrical discharge machining (EDM) apparatus cannot effectively predict the machining accuracy of a workpiece during a machining process, and can only perform offline machining accuracy measurement on the processed workpiece through a measuring machine.

To overcome the shortcomings, currently related machining information is monitored through a prediction model during the electrical discharge machining process to predict the machining accuracy of subsequent workpieces. However, the model fails to reflect the consumption of the discharge electrode in real time and can only obtain the consumption of the discharge electrode relying on offline measurement, which greatly affects the operation rate of the electrical discharge machining (EDM) apparatus.

In view of this, a prediction method is needed for predicting the electrical discharge machining (EDM) accuracy to solve the shortcomings.

SUMMARY

The disclosure provides an online prediction method of tool-electrode consumption and a prediction method of machining accuracy, so that the consumption of discharge electrode is predicted in real time during the electrical discharge machining process, and the machining parameters of an electrical discharge machining (EDM) apparatus are adjusted accordingly to obtain preferable electrical discharge machining (EDM) accuracy.

The online prediction method of tool-electrode consumption in the disclosure, adapted for an electrical discharge machining (EDM) apparatus, includes: an experimental design; extracting electrode consumption variables from machining parameters of the electrical discharge machining (EDM) apparatus; and obtaining a correlation between the machining parameters and the electrode consumption variables through a correlation analysis to obtain a prediction model capable of predicting an effective contact area of a tool-electrode and a workpiece.

The prediction method of machining accuracy in the disclosure includes: extracting a plurality of key machining feature values of an electrical discharge machining (EDM) apparatus through a model-based extraction method, in which the key machining feature values include those obtained by the online prediction method of the electrode consumption of the aforementioned tool-electrodes; establishing an electrical discharge machining (EDM) accuracy prediction model based on the key machining feature values; and sensing a plurality of sets of discharge voltage signals and a plurality of sets of discharge current signals of the electrical discharge machining (EDM) apparatus as input values in real time and transmitting the plurality of the sets of the discharge voltage signals and the plurality of the sets of the discharge current signals of the electrical discharge machining (EDM) apparatus to the machining accuracy prediction model, to output at least one electrical discharge machining accuracy prediction value as output values in real time.

Based on the above, in the embodiments of the disclosure, with the online prediction method of tool-electrode consumption, a prediction model capable of predicting an effective contact area of a tool-electrode and a workpiece is obtained through an experimental design, extracting electrode consumption variables from machining parameters of an electrical discharge machining (EDM) apparatus, and obtaining a correlation between the machining parameters and the electrode consumption variables through a correlation analysis. In this way, the effective contact area obtained from the model represents the ability of the real-time discharge electrode to perform electrical discharge machining on the workpiece and correspondingly reflects the consumption degree of the discharge electrode after the previous machining. Therefore, the related control system is capable of adaptively adjusting the related machining parameters of the electrical discharge machining (EDM) apparatus according to the ability of the real-time discharge electrode to perform electrical discharge machining, so as to adapt to the required machining process of the workpiece and contribute to the machining accuracy.

DESCRIPTION OF THE EMBODIMENTS

Figure 1:
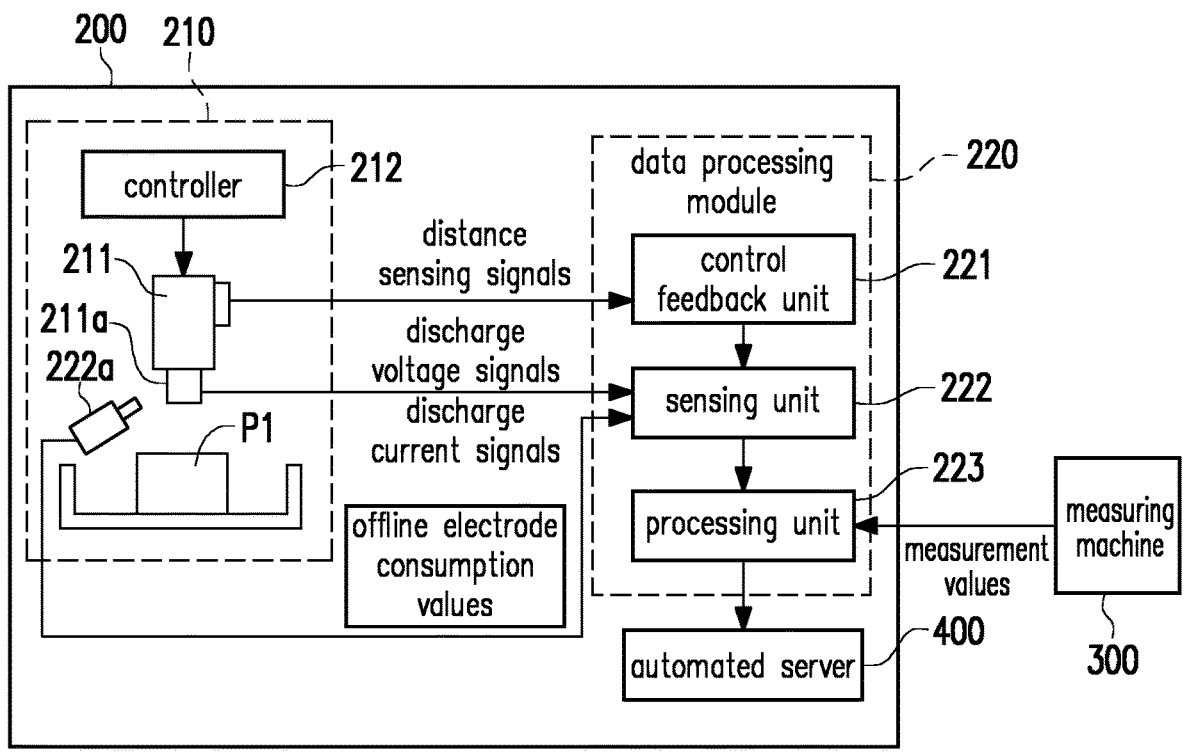
FIG. 1 is a schematic view of an electric discharge machining (EDM) accuracy prediction system according to an embodiment of the disclosure.

FIG. 1 is a schematic view of an electric discharge machining (EDM) accuracy prediction system according to an embodiment of the disclosure. Referring to FIG. 1, an electric discharge machining (EDM) accuracy prediction system 200 of the embodiment includes an electric discharge machining (EDM) apparatus 210 and a data processing module 220, and the data processing module 220 is connected to the EDM apparatus 210 for information. The EDM apparatus 210 has a main shaft 211 and a tool-electrode 211a disposed on the main shaft 211 to perform electrical discharge machining on a workpiece P1 through the tool-electrode 211a. The data processing module 220 includes a control feedback unit 221, a sensing unit 222, and a processing unit 223. The control feedback unit 221 is adapted to sense a distance signal and is adapted to determine whether the sensing unit 222 needs to capture the process data (including discharge voltage signals and discharge current signals) of the EDM apparatus 210 during the online processing. The processing unit 223 establishes a plurality of machining features according to the process data captured by the sensing unit 222 and then gathers key machining feature values related to machining accuracy from the machining features according to measurement values (the measurement values refer to the measurement values of the quality of the workpiece after the electrical discharge machining (EDM) apparatus processes the workpiece) of different measured items processed by a measuring machine 300, so that the key machining feature values are provided to an automated server 400 and an electrical discharge machining (EDM) accuracy prediction model is established accordingly to predict the subsequent machining accuracy of the EDM apparatus 210.

For example, the automated server 400 uses a neural network (NN) method and a regression analysis method (e.g., a partial least square (PLS) method) to establish the electrical discharge machining (EDM) accuracy prediction model. For clarification, the prediction model used in the embodiment may be the machining accuracy prediction model established by the automated server disclosed in Patent No. TW 1349867, but this is not intended to limit the disclosure.

Generally, the model-based extraction method of the embodiment mainly gathers the process data (e.g., electrode consumption values, discharge voltage signals, and discharge current signals) of the EDM apparatus 210 during the discharge process, then a plurality of machining features are established according to the process data, and the key machining feature values adapted to estimate the machining accuracy are extracted from the machining features through data pre-processing technology. The gathered key machining feature values are mainly provided to the automated server 400 to establish the EDM accuracy prediction model to predict the machining accuracy of the EDM apparatus 210.

Figure 2A:
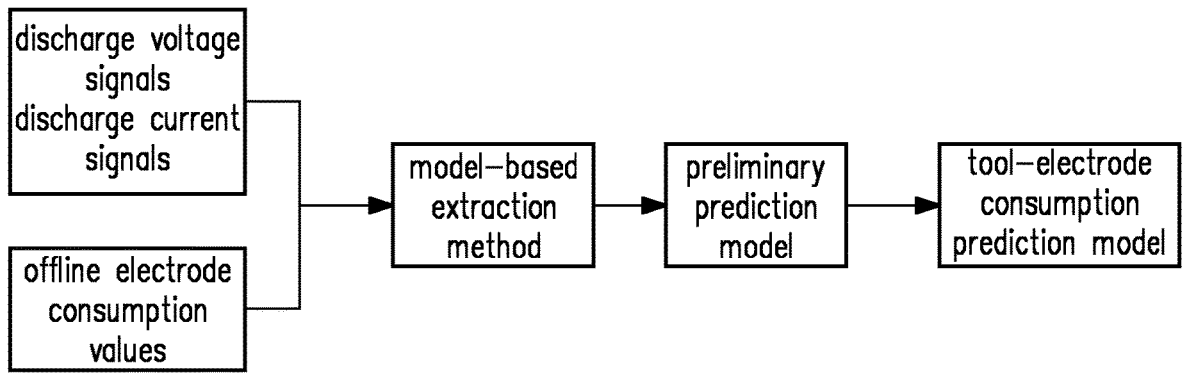
FIG. 2A and FIG. 2B respectively illustrate schematic views of establishing a prediction model according to the disclosure.
Figure 2B:
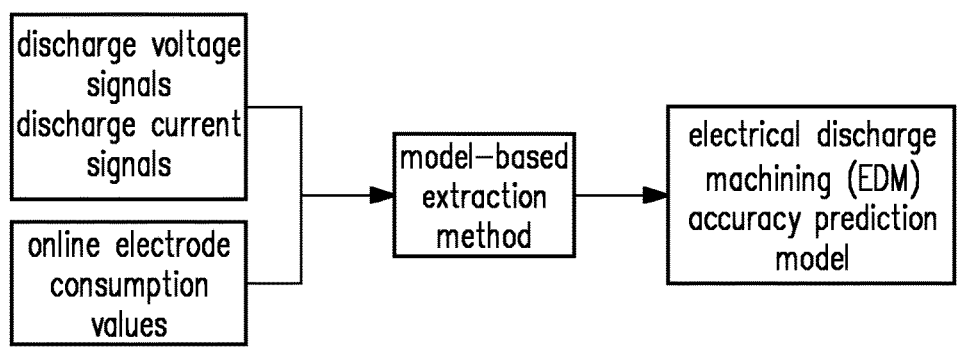
Figure 2C:
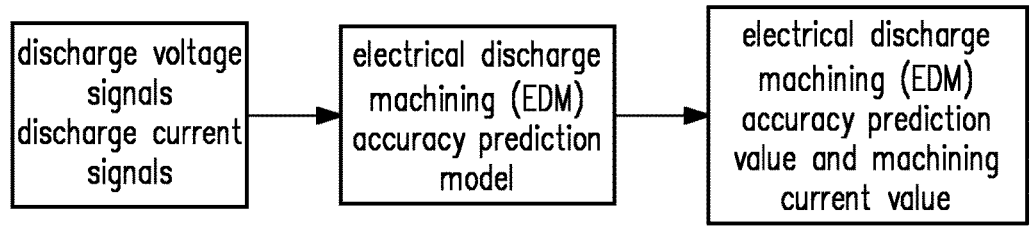
FIG. 2C is a schematic view of the input and the output of an electrical discharge machining (EDM) accuracy prediction model.
Figure 3A:
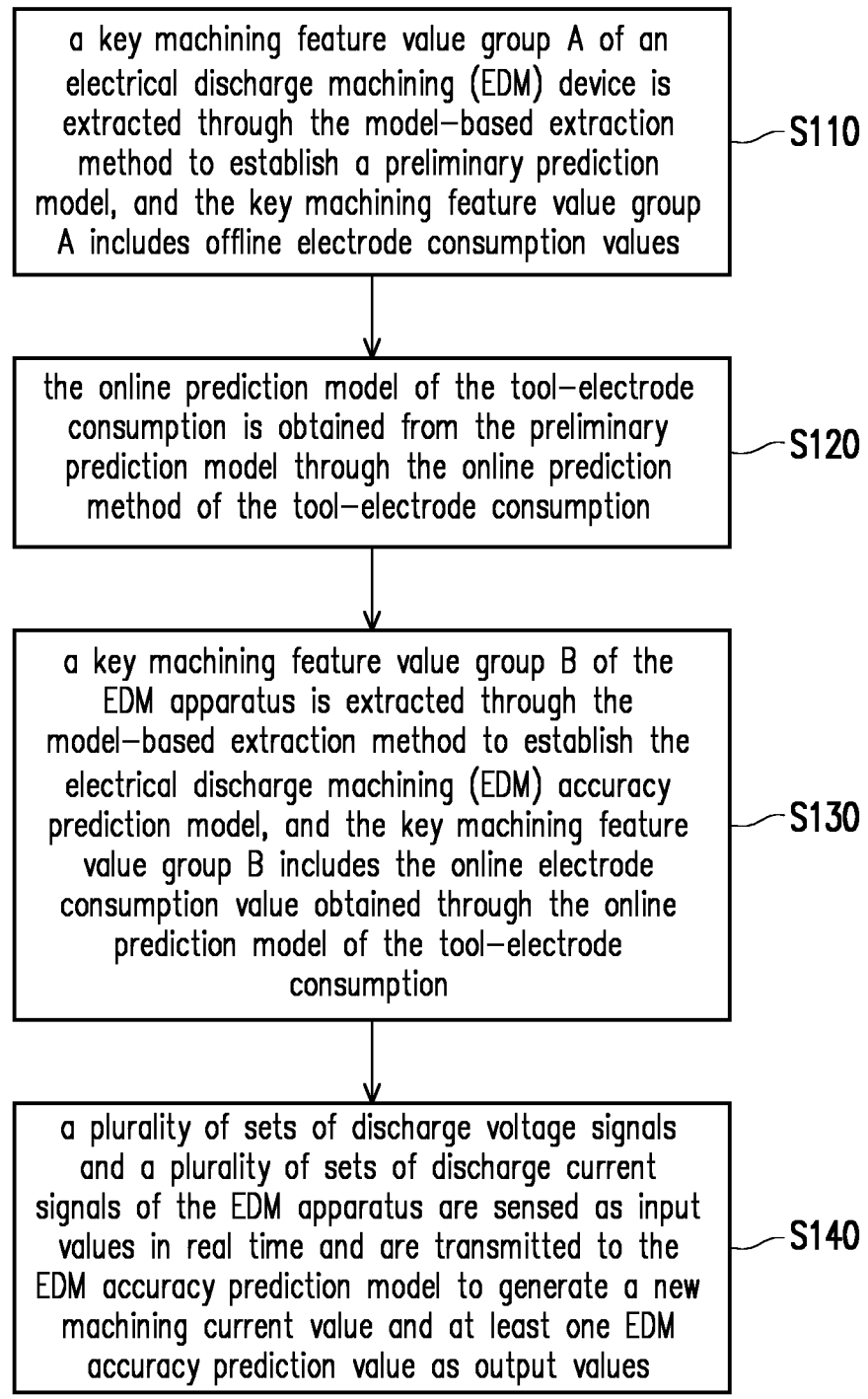
FIG. 3A is a flowchart illustrating establishing an EDM accuracy prediction model according to the disclosure.
Figure 3B:
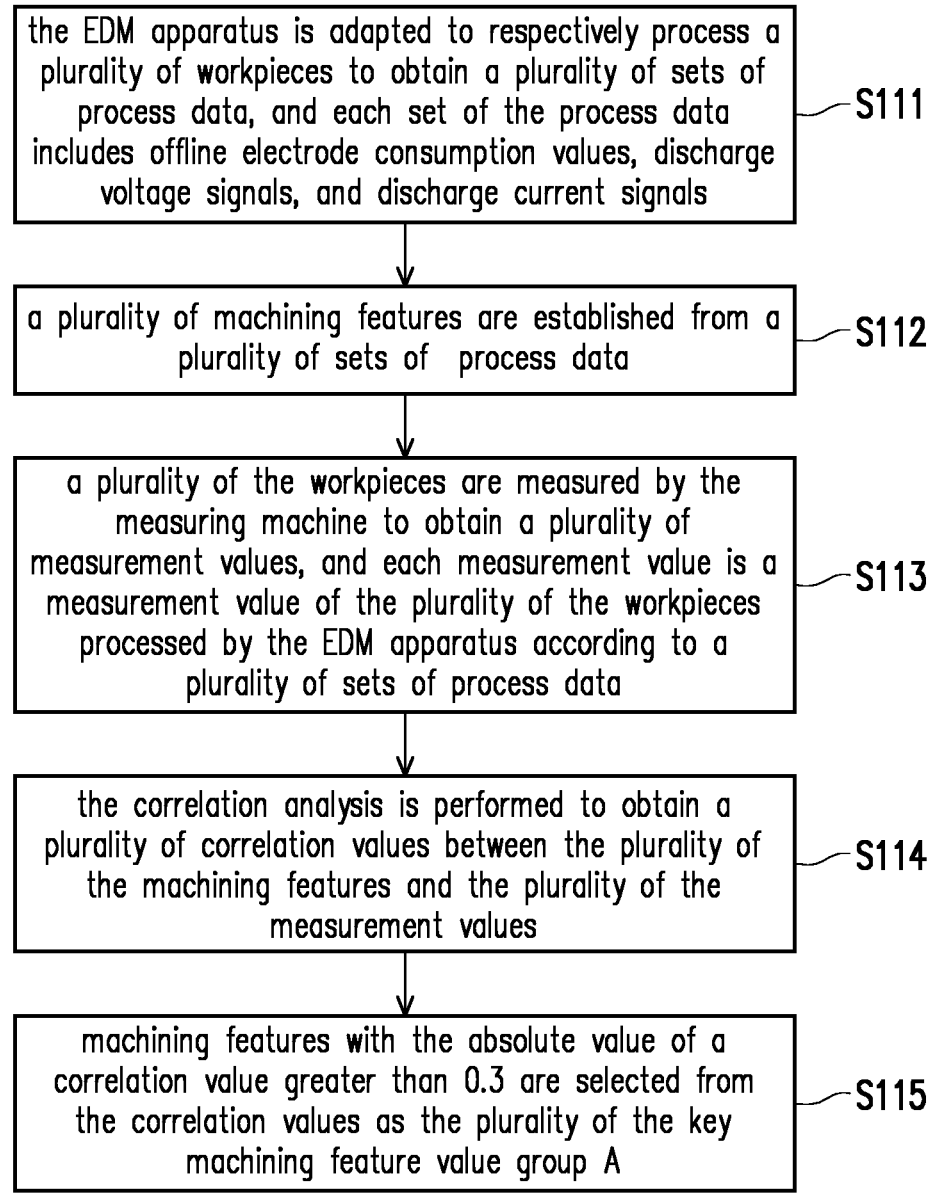
FIG. 3B is a flowchart illustrating establishing the prediction model of FIG. 2A.
Figure 3C:
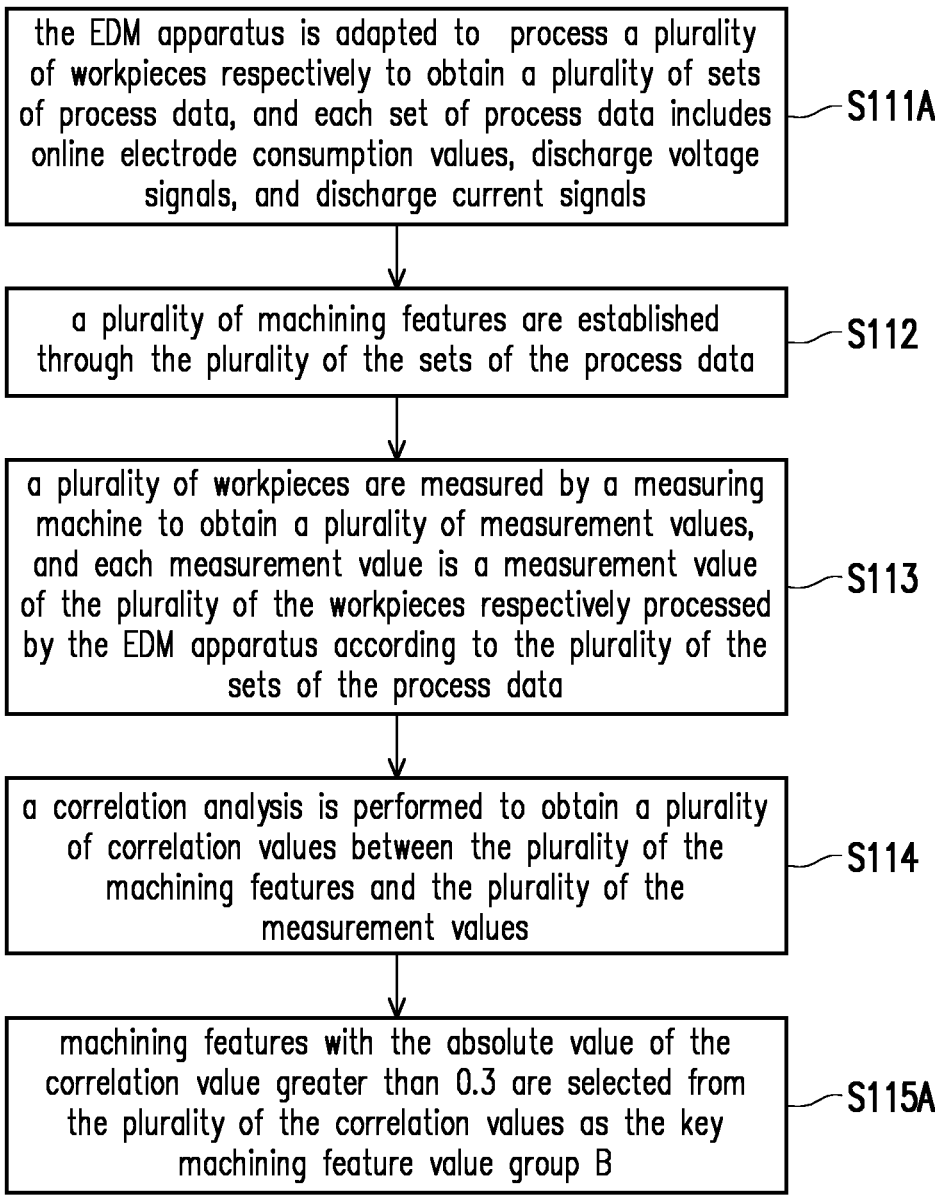
FIG. 3C is a flowchart illustrating establishing the EDM accuracy prediction model of FIG. 2B.

In detail, FIG. 2A and FIG. 2B respectively illustrate schematic views of establishing a prediction model of the disclosure. FIG. 2C is a schematic view of the input and the output of an electrical discharge machining (EDM) accuracy prediction model. FIG. 3A is a flowchart illustrating establishing an EDM accuracy prediction model according to the disclosure. FIG. 3B is a flowchart illustrating establishing the prediction model of FIG. 2A. FIG. 3C is a flowchart illustrating establishing the EDM accuracy prediction model of FIG. 2B. Meanwhile, the model establishment of FIG. 2A corresponds to step S110 in the flowchart in FIG. 3A, and the model establishment of FIG. 2B corresponds to step S130 in the flowchart in FIG. 3A.

Referring to FIG. 2A and FIG. 3A first, in step S110, a key machining feature value group A of the EDM device 210 is extracted through the model-based extraction method to establish a preliminary prediction model, and the key machining feature value group A includes offline electrode consumption values. Next, in step S120, the online prediction model of the tool-electrode consumption is obtained from the preliminary prediction model through the online prediction method of the tool-electrode consumption. Then, in step S130, a key machining feature value group B of the EDM apparatus 210 is extracted through the model-based extraction method to establish the EDM accuracy prediction model, and the key machining feature value group B includes the online electrode consumption value obtained through the online prediction model of the tool-electrode consumption. Finally, in step S140, when the EDM apparatus 210 is performing subsequent electrical discharge machining, a plurality of sets of discharge voltage signals and a plurality of sets of discharge current signals of the EDM apparatus 210 are sensed as input values in real time and are transmitted to the EDM accuracy prediction model to generate a new machining current value and at least one EDM accuracy prediction value as output values; and the new machining current value generated therein is transmitted to a controller 212 so that the EDM apparatus 210 uses it as a basis for driving the subsequent electrical discharge machining actions.

In short, in the electrical discharge machining process, since the online prediction model of the machining electrode consumption reflects the real-time status of the tool-electrode 211a in real time, the effect produced in step S140 is that in addition to informing the operator by providing the prediction value of the electrical discharge machining accuracy, the electrical discharge current (i.e., the new machining current value) is further adjusted accordingly and is adjusted appropriately according to the consumption of the tool-electrode 211a during the electrical discharge machining process.

Referring to FIG. 3B, the related detailed procedures of step S110 are further illustrated. In step S111, the EDM apparatus 210 is adapted to respectively process a plurality of workpieces P1 to obtain a plurality of sets of process data; and each set of the process data includes offline electrode consumption values, discharge voltage signals, and discharge current signals. A high-voltage probe and a current hook are adapted to sense the discharge voltage and the discharge current of the EDM apparatus 210, and an image sensor 222a is adapted to measure the electrode consumption value. Then, in step S112, a plurality of machining features are established from the process data.

Note that the machining features of the embodiment include electrode consumption values, spark frequency, open circuit ratios, short circuit ratios, average short circuit time, short circuit time standard deviations, average short circuit currents, short circuit current standard deviations, average delay time, delay time standard deviations, average peak discharge currents, peak current standard deviations, average discharge time, discharge time standard deviations, average discharge energy, and discharge energy standard deviations.

In the machining features, the average delay time and the short circuit ratios are established from the discharge voltage signals, and the average delay time is defined as the time difference between the time when a sufficient open circuit voltage has been established and the time when a voltage pulse passes through the gap between the electrode and the workpiece, and currents start to be discharged. The short circuit ratio is defined as the value of a short circuit pulse (SCP) divided by the value of a discharge pulse, and the short circuit pulse is when an open circuit voltage value is continuously less than a specified voltage threshold during a discharge pulse period, then the very discharge pulse period is recorded as a short circuit pulse.

In the machining features, the spark frequency, the average peak discharge currents, and the average discharge time are established from the discharge current signals. The average spark frequency is defined as that in a pulse time, if the current wave peak value exceeds the minimum threshold peak value, it is defined that current sparks occur, and the spark frequency is defined as the total number of sparks that occur during the sampling period. The average peak discharge current is defined as the average of all peak currents during the sampling period, and the peak current is the large current value that reaches the workpiece through the electrode during the pulse period. An average discharge current pulse duration is defined as the average of all discharge current pulse duration during the sampling period, and the discharge current pulse duration is the time difference between the starting time and the ending time of a discharge current waveform.

In the machining features, the average short circuit time, the open circuit ratios, the average discharge energy, the average short circuit currents are established altogether according to the discharge current signals and the discharge voltage signals, the average short circuit time is related to short circuit duration, and the short circuit duration is defined as that when multiple consecutive short circuits occur during a discharge pulse period (more than two consecutive pulses), then the short circuit duration is the time difference between the first short circuit peak and the last short circuit peak during multiple consecutive short circuits. The open circuit ratio is defined as the times of open circuits divided by the total times of discharge pulses during the sampling period. In a certain pulse time, when an ignition voltage is disconnected and is not increased along with the discharge current, it is called an open circuit. If an open circuit occurs, it means that the ignition voltage fails to induce a subsequent discharge current, and the ignition voltage is an invalid pulse. The average discharge energy is mainly used to maintain the stability of the electrical discharge machining process to ensure the machining quality; and the discharge energy (E) formula of the i-th discharge is as follows, where tei is discharge duration, Ui is a discharge voltage, and Ipi is the peak current. The formula assumes that the discharge voltage remains unchanged during the discharge process.

$$E_i = \int_0^{t_{ei}} I_{pi} U_i \, dt$$

For clarification, according to the foregoing disclosure, the calculation methods of the standard deviations of the short circuit time standard deviations, the short circuit current standard deviations, the delay time standard deviations, the peak current standard deviations, the discharge time standard deviations, and the discharge energy standard deviations are well known to those with ordinary art in the field to which the disclosure belongs and therefore are not iterated.

Referring to FIG. 3B again, next, in step S113, a plurality of the workpieces P1 are measured by the measuring machine 300 to obtain a plurality of measurement values, and each measurement value is a measurement value of the plurality of the workpieces P1 processed by the EDM apparatus 210 according to a plurality of sets of process data. For example, electrical discharge machining is performed on the plurality of the workpieces P1 through the tool-electrodes 211a in different shapes and sizes to form blind holes, and the sizes and the roughness of the blind holes are measured by the measuring machine 300 after the blind holes are completed.

After taking the measurement values, the correlation analysis in step S114 is performed to obtain a plurality of correlation values between the plurality of the machining features and the plurality of the measurement values. After locating the correlation values between the machining features and the measurement values, then proceed to step S115 to select machining features with a larger correlation value from the correlation values to serve as the plurality of the key machining feature values (i.e., the key machining feature value group A); and in the embodiment, a machining feature with the absolute value of a correlation value greater than 0.3 is selected. At the phase, all it takes to complete step S110 is completed, that is, the related key machining feature values including the offline electrode consumption values are used to establish the preliminary prediction model.

Figure 4A:
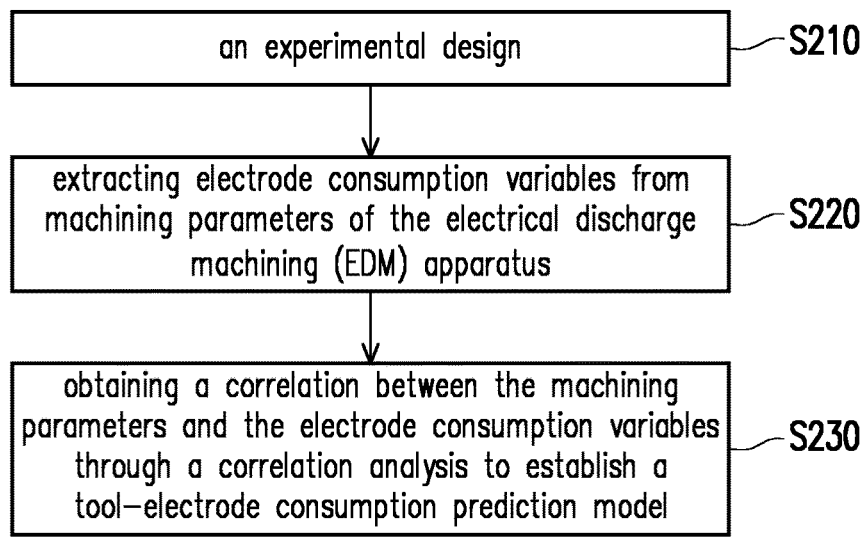
FIG. 4A and FIG. 4B are flowcharts illustrating establishing the prediction model of FIG. 2B.
Figure 4B:
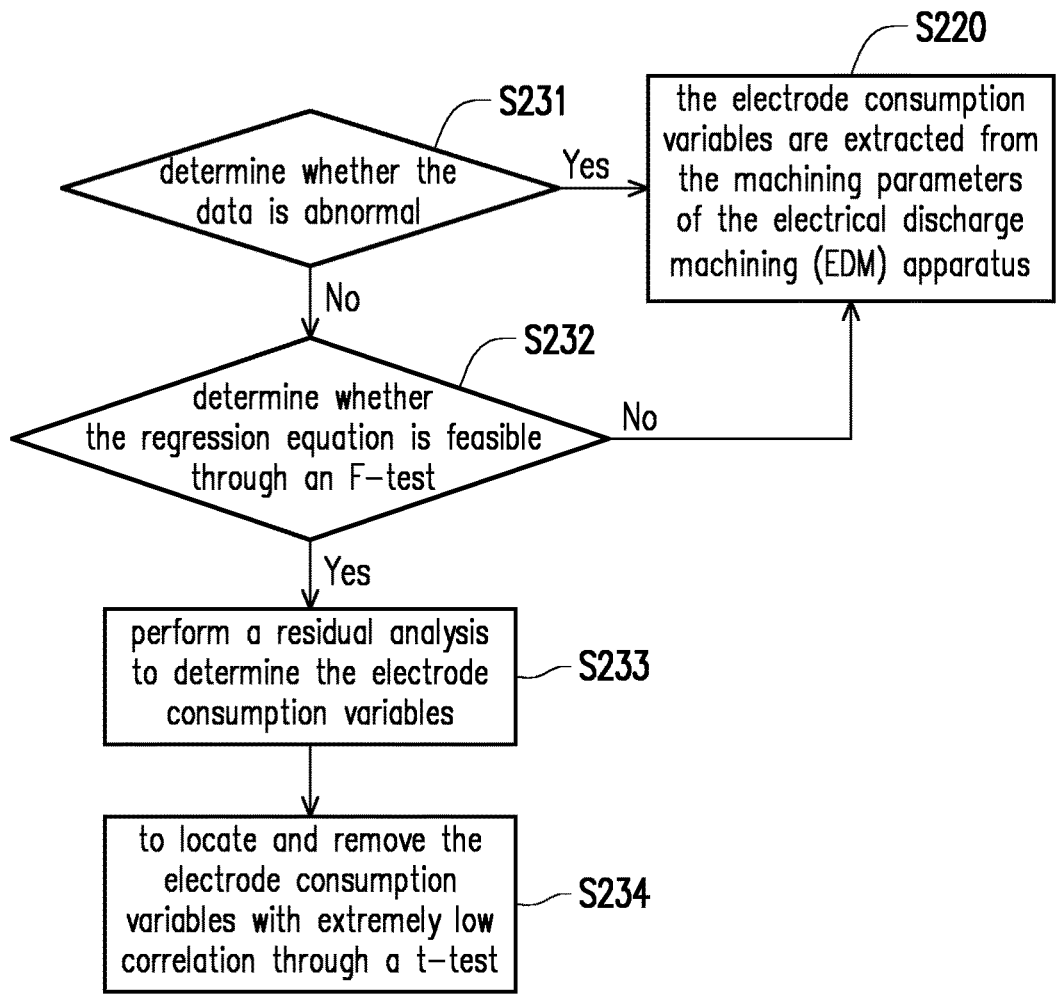

FIG. 4A and FIG. 4B are flowcharts illustrating establishing the prediction model of FIG. 2B. Referring to FIG. 4A and FIG. 4B, step S120 is illustrated in detail. In the embodiment, the experimental design of step S210 is first performed, and then step S220 is performed to extract electrode consumption variables from the machining parameters of the electrical discharge machining (EDM) apparatus 210. The machining parameters are obtained from the related machining features (and especially the key machining feature values other than the offline electrode consumption values) of the preliminary prediction model. Finally, in step S230, the correlation between the machining parameters and the electrode consumption variables is obtained through the correlation analysis to establish a tool-electrode consumption prediction model. Refer to FIG. 4B again. Specifically, step S230 further includes step S231 to determine whether the data is abnormal. If yes, re-perform step S220, that is, the electrode consumption variables are re-extracted from the machining parameters of the electrical discharge machining (EDM) apparatus. If not, proceed to step S232 to determine whether the regression equation is feasible through an F-test. If yes, proceed to the subsequent step S233; if not, return to step S220 to extract the electrode consumption variables from the machining parameters of the EDM apparatus 210 again; and if yes, perform a residual analysis to determine the electrode consumption variables in step S233, and then perform step S234 to locate and remove the electrode consumption variables with extremely low correlation through a t-test. At the phase, all it takes to establish the tool-electrode consumption prediction model in step S230 is completed.

Next, refer to FIG. 2B and FIG. 3C. When the tool-electrode consumption prediction model is obtained from the preliminary prediction model, it means that the EDM apparatus 210 obtains the consumption (the online electrode consumption values) of the tool-electrode 211a during the electrical discharge machining process, so the process similar to that shown in FIG. 3B is used again. In step S111A shown in FIG. 3C, the EDM apparatus 210 is adapted to process a plurality of workpieces P1 respectively to obtain a plurality of sets of process data, and each set of the process data includes online electrode consumption values, discharge voltage signals, and discharge current signals. Then, steps S112 to S114 are performed as shown in FIG. 3B. Finally, in step S115A, machining features with the absolute value of a correlation value greater than 0.3 are selected from a plurality of correlation values as the key machining feature value group B and are accordingly applied into step S130 shown in FIG. 3A, that is, the key machining feature group B including the online electrode consumption value are obtained through the model-based extraction method to accordingly establish the electric discharge machining prediction model. Finally, as shown in step S140 in FIG. 2C and FIG. 3A, during the electrical discharge machining process, the electrical discharge voltage signals and electrical current signals sensed in real time are matched with the online electrode consumption values to successfully predict the electrical discharge machining accuracy; a new machining current value is generated for the EDM apparatus 210 to perform subsequent machining; and the key machining feature value group B is adapted to improve the prediction ability of the model.

Figures 5, 6:
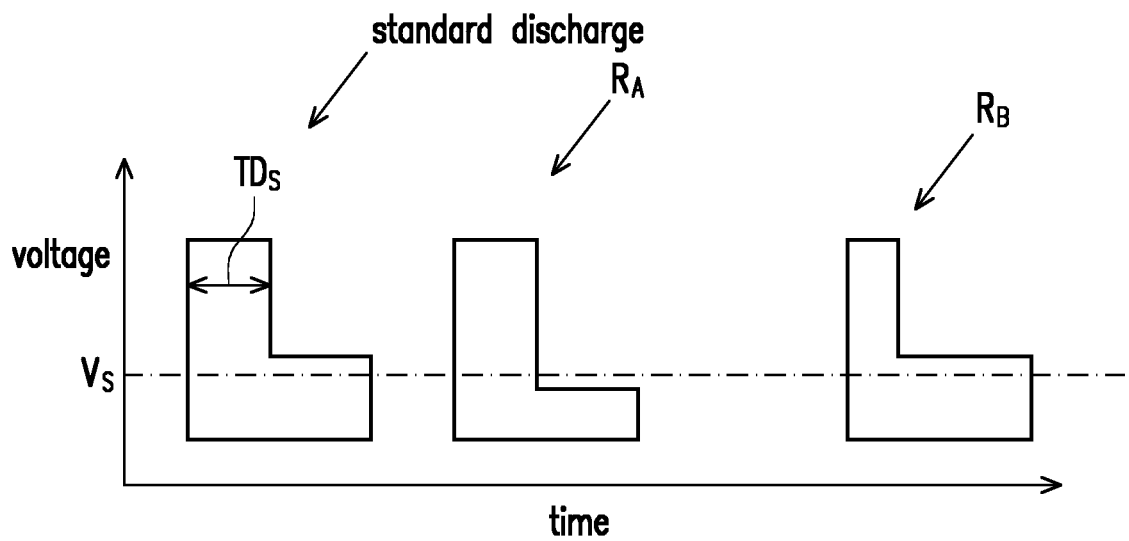
FIG. 5 illustrates a schematic view of discharge voltage waveforms.
FIG. 6 illustrates the experimental data of electrode consumption variables and an effective contact area.

In the embodiment, the electrode consumption variables mentioned in step S220 include times of effective discharge, a machining depth, and accumulated machining time; and the times of effective discharge equal the total times of discharge minus the times of abnormal discharge. The times of the abnormal discharge include times of discharge when a rated voltage (Ue) is less than a set level (equivalent to abnormal discharge RA) and times of discharge when discharge delay time (TD) is less than set time (equivalent to abnormal discharge RB) during discharge. FIG. 5 illustrates a schematic view of discharge voltage waveforms. FIG. 6 illustrates experimental data of electrode consumption variables and an effective contact area. Referring to FIG. 5 and FIG. 6 together, in step S230 in the embodiment, the regression equation constructed by the correlation analysis is as follows:

$$Aeff=A1+A2*Ntotal-A3*RB-A4*L+A5*T+A6*L*T-A7*RB*L+A8*Ntotal*L+A9*Ntotal*RB-A10Ntotal*T-A11*Ntotal*L*T+A12Ntotal*L*T*RB,$$

The Aeff is the effective contact area between the tool-electrode 211a and the workpiece P1, and Ntotal is the total times of discharge. Meanwhile, RB is regarded as the times of discharge when the discharge delay time (TD) is less than the set time, L is the machining depth, and T is the accumulated machining time. As the waveforms of the three voltage signals shown in FIG. 5, the one to the left is the voltage waveform that meets the standard discharge required for machining, which has the standard voltage level VS and the standard discharge delay time TDS; the one in the middle is the abnormal discharge RA, that is, the discharge voltage waveform whose rated voltage is less than the standard level VS during discharge; and the one to the right is the abnormal discharge RB, that is, the discharge voltage waveform whose the discharge delay time is less than the standard time TDS. Therefore, the times of effective discharge equal the total times of discharge minus the times of the abnormal discharge (RA and RB) times as shown in FIG. 5. Note that the parameters used in the regression equation may be appropriately changed according to the actual conditions of the machining apparatus. For example, if with the control of voltage, the electrical discharge machining (EDM) apparatus can avoid the situation in which the rated voltage (Ue) is less than the abnormal charge of the set level during discharge, the regression equation may be excluded.

In addition, as shown in FIG. 6, experiments verify the correlation among the electrode consumption variables, that is, the total times of discharge Ntotal, the times of abnormal discharge (RA and RB), the machining depth L, the accumulated machining time T, and the effective contact area (Aeff). With the correlation index (FITS) in the table as marks, it is clear that as the effective contact area (Aeff) decreases, the correlation index (FITS) also decreases, which means that the electrode consumption variables do have a positive correlation with the effective contact area. Meanwhile, for the electrical discharge machining process, the shape (including geometric shape and size) of the tool-electrode 211a is one of the main factors that affect the electrical discharge machining accuracy. Therefore, in the embodiment, obtaining the effective contact area in real time during the machining process means that the electrical discharge machining accuracy is obtained. Accordingly, in the embodiment, through the online prediction method (and the model) of the tool-electrode, the real-time status of the tool-electrode 211a is obtained in real time, and the corresponding adaptative scheme is proposed accordingly.

Based on the above, in the embodiments of the disclosure, with the online prediction method of tool-electrode consumption, a prediction model capable of predicting an effective contact area of a tool-electrode and a workpiece is obtained through an experimental design, extracting electrode consumption variables from machining parameters of an electrical discharge machining (EDM) apparatus, and obtaining a correlation between the machining parameters and the electrode consumption variables through a correlation analysis. In this way, the effective contact area obtained from the model represents the ability of the real-time discharge electrode to perform electrical discharge machining on the workpiece and correspondingly reflects the consumption degree of the discharge electrode after the previous machining. Therefore, the related control system is capable of adaptively adjusting the related machining parameters of the electrical discharge machining (EDM) apparatus according to the ability of the real-time discharge electrode to perform electrical discharge machining, so as to adapt to the required machining process of the workpiece and contribute to the machining accuracy.

What is claimed is:

1. An online prediction method of tool-electrode consumption, adapted for an electrical discharge machining (EDM) apparatus, comprising:
   an experimental design;
   extracting electrode consumption variables from machining parameters of the electrical discharge machining (EDM) apparatus, wherein the electrode consumption variables comprise times of effective discharge, a machining depth, and accumulated machining time, the EDM apparatus has a main shaft and a tool-electrode disposed on the main shaft to perform electrical discharge machining on a workpiece through the tool-electrode,
   obtaining a correlation between the machining parameters and the electrode consumption variables through a correlation analysis to establish a prediction model capable of predicting an effective contact area of a tool-electrode and the workpiece,
   adjusting the machining parameters based on the predicted effective contact area, and
   controlling the electrical discharge machining apparatus based on adjusted machining parameters.

2. The online prediction method of tool-electrode consumption according to claim 1, wherein the times of effective discharge equals total times of discharge minus times of abnormal discharge.

3. The online prediction method of tool-electrode consumption according to claim 2, wherein the times of the abnormal discharge comprise times of discharge when a rated voltage (Ue) is less than a set level and times of discharge when discharge delay time (TD) is less than set time during discharge.

4. The online prediction method of tool-electrode consumption according to claim 1, wherein the correlation analysis comprises:
   determining whether a data is abnormal;

determining whether a regression equation is feasible through an F-test;
determining the electrode consumption variables through a residual analysis; and
locating and removing electrode consumption variables with zero correlation through a t-test.

5. A prediction method of machining accuracy, comprising:
extracting a key machining feature value group A of an electrical discharge machining (EDM) apparatus through a model-based extraction method to establish a preliminary prediction model, wherein the key machining feature value group A comprises offline electrode consumption values;
obtaining an online prediction model of tool-electrode consumption from the preliminary prediction model through the online prediction methods of tool-electrode consumption in claim 1,
and
extracting a key machining feature value group B of the electrical discharge machining (EDM) apparatus through the model-based extraction method to establish an electrical discharge machining (EDM) accuracy prediction model, wherein the key machining feature value group B comprises an online electrode consumption value obtained by the online prediction model of the tool-electrode consumption.

6. The prediction method of machining accuracy according to claim 5, further comprising:
sensing a plurality of sets of discharge voltage signals and a plurality of sets of discharge current signals of the electrical discharge machining (EDM) apparatus as input values in real time, and transmitting the plurality of the sets of the discharge voltage signals and the plurality of the sets of the discharge current signals of the electrical discharge machining (EDM) apparatus to the electrical discharge machining (EDM) accuracy prediction model to generate machining currents and at least one electrical discharge machining accuracy prediction value as output values.

7. The prediction method of machining accuracy according to claim 5, wherein the step of extracting the key machining feature value group A of the electrical discharge machining (EDM) apparatus comprises:
respectively processing a plurality of workpieces through the electrical discharge machining (EDM) apparatus to obtain a plurality of sets of process data, wherein each set of the process data comprises the offline electrode consumption values, the discharge voltage signals, and the discharge current signals;
establishing a plurality of machining features from the plurality of the sets of the process data;
measuring the plurality of the workpieces to obtain a plurality of measurement values through a measuring machine, wherein each measurement value is a measurement value of the plurality of the workpieces processed by the electrical discharge machining (EDM) apparatus according to the plurality of the sets of process data;
performing a correlation analysis to obtain a plurality of correlation values between the plurality of the machining features and the plurality of the measurement values; and
selecting machining features with an absolute value of a correlation value greater than 0.3 from the plurality of the correlation values as a plurality of key machining feature values.

8. The prediction method of machining accuracy according to claim 7, wherein the measurement values are roughness measurement values of the plurality of the workpieces, and the plurality of the machining features comprise the offline electrode consumption values, spark frequency, open circuit ratios, short circuit ratios, average short circuit time, short circuit time standard deviations, average short circuit currents, short circuit current standard deviations, average delay time, delay time standard deviations, average peak discharge currents, peak current standard deviations, average discharge time, discharge time standard deviations, average discharge energy, and standard deviations of discharge energy.

9. The prediction method of machining accuracy according to claim 5, wherein the step of extracting the key machining feature value group B of the electrical discharge machining (EDM) apparatus comprises:
respectively processing a plurality of workpieces through the electrical discharge machining (EDM) apparatus to obtain a plurality of sets of process data, wherein each set of the process data comprises the online electrode consumption values, the discharge voltage signals, and the discharge current signals;
establishing a plurality of machining features from the plurality of the sets of the process data;
measuring the plurality of the workpieces to obtain a plurality of measurement values through a measuring machine, wherein each measurement value is a measurement value of the plurality of the workpieces processed by the electrical discharge machining (EDM) apparatus according to the plurality of the sets of process data;
performing a correlation analysis to obtain a plurality of correlation values between the plurality of the machining features and the plurality of the measurement values; and
selecting machining features with an absolute value of a correlation value greater than 0.3 from the plurality of the correlation values as a plurality of key machining feature values.

10. The prediction method of machining accuracy according to claim 9, wherein the measurement values are roughness measurement values of the plurality of the workpieces, and the plurality of the machining features comprise the online electrode consumption values, spark frequency, open circuit ratios, short circuit ratios, average short circuit time, short circuit time standard deviations, average short circuit currents, short circuit current standard deviations, average delay time, delay time standard deviations, average peak discharge currents, peak current standard deviations, average discharge time, discharge time standard deviations, average discharge energy, and standard deviations of discharge energy.

11. The prediction method of machining accuracy according to claim 5, wherein the electrode consumption variables comprise times of effective discharge, a machining depth, and accumulated machining time, wherein the times of effective discharge equals total times of discharge minus times of abnormal discharge, wherein the times of the abnormal discharge comprise times of discharge when a rated voltage (Ue) is less than a set level and times of discharge when discharge delay time (TD) is less than set time during discharge.

12. The prediction method of machining accuracy according to claim 5, wherein the correlation analysis comprises:
determining whether a data is abnormal;

determining whether a regression equation is feasible through an F-test;
determining the electrode consumption variables through a residual analysis; and
locating and removing electrode consumption variables with zero correlation through a t-test.

* * * * *